United States Patent [19]

Bussey

[11] Patent Number: 5,460,159

[45] Date of Patent: Oct. 24, 1995

[54] MULTI SMOKE COOKER

[76] Inventor: Curtis L. Bussey, P.O. Box 1001, Greenville, Ga. 30222

[21] Appl. No.: 385,591

[22] Filed: Feb. 8, 1995

[51] Int. Cl.⁶ ..................................................... A47J 37/00
[52] U.S. Cl. ..................... 126/25 R; 126/9 R; 126/41 R; 99/340; 99/448; 99/482
[58] Field of Search ............................... 126/41 R, 41 D, 126/41 E, 268, 9 R; 99/467, 473, 481, 482, 422, 447, 340, 448

[56] References Cited

U.S. PATENT DOCUMENTS

| | | | |
|---|---|---|---|
| 3,088,395 | 5/1963 | Miller | 99/340 |
| 4,643,162 | 2/1987 | Collins | 126/41 D X |
| 4,840,118 | 6/1989 | Rinehart | 126/25 R X |
| 4,877,011 | 10/1989 | Willice | 126/41 R X |
| 4,979,436 | 12/1990 | McGowan | 99/340 |
| 5,078,049 | 1/1992 | Glanton | 99/482 |
| 5,195,423 | 3/1993 | Beller | 126/25 R X |
| 5,359,923 | 11/1994 | Boswell | 126/25 R X |

Primary Examiner—Larry Jones

[57] ABSTRACT

A new and improved multi smoke cooker with a hollow container having an open top, a closed bottom, a front wall, a rear wall, and two side walls. An upper opening is formed in the front wall. A lower opening is formed in the front wall downward of the upper opening. An inner lining is secured within the hollow container. The inner lining has two vertical posts. Each of the vertical posts has a plurality of inwardly extending pieces integral therewith. A grill is coupled with each vertical post and extends outwardly towards the open top of the hollow container. A grill grate is coupled with one of the plurality of inwardly extending pieces and aligned with the upper opening of the container. The grill grate serves to hold coals. A coal catcher with outer handle is removably coupled with two of the inwardly extending pieces and slidably extends outward of the lower opening of the hollow container. A top lid has a lower portion and an upper portion. The lower portion is hingedly secured to an edge of the open top of the hollow container. The upper portion has an adjustable vent therein.

7 Claims, 4 Drawing Sheets

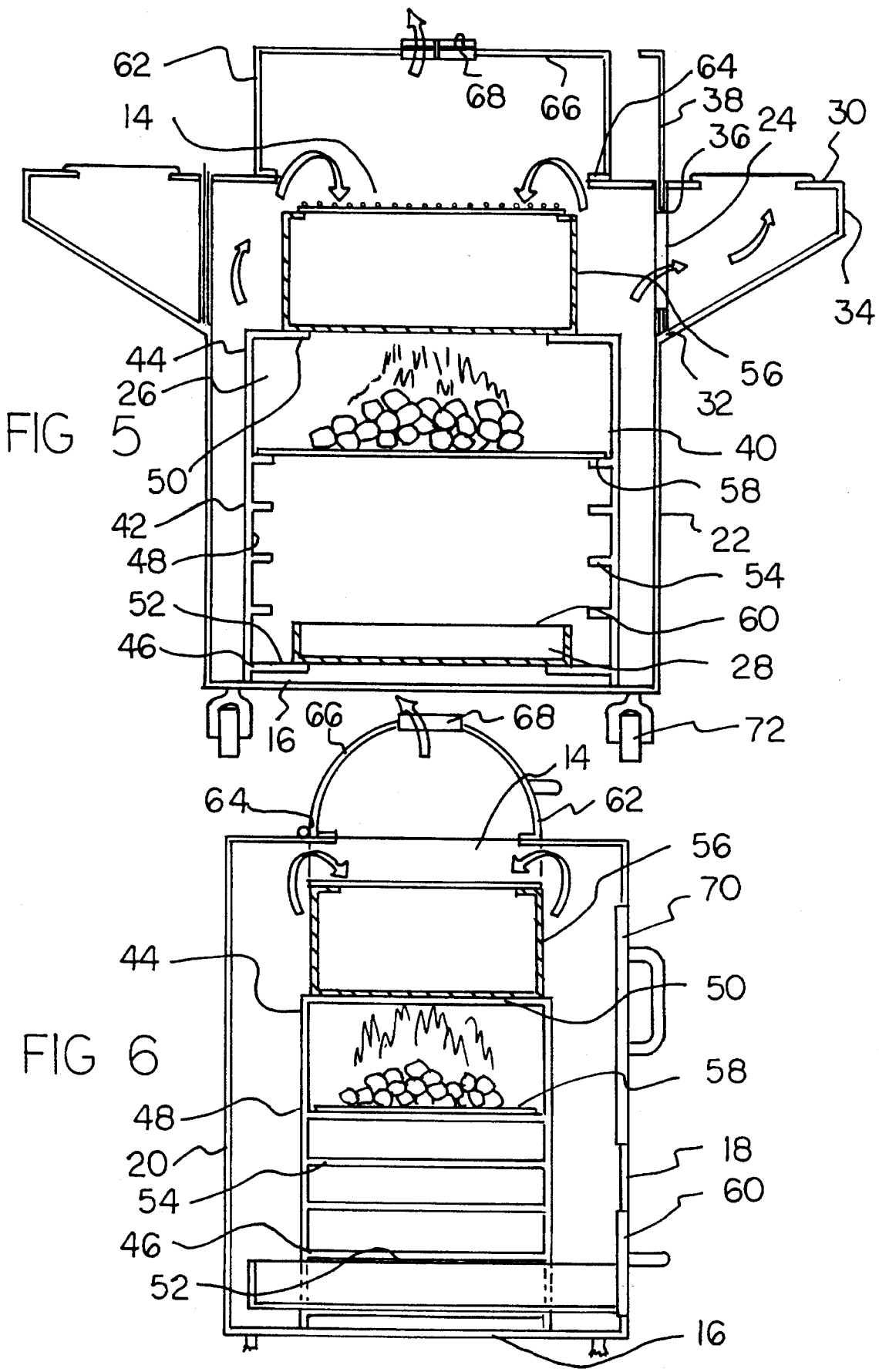

MULTI SMOKE COOKER

BACKGROUND OF THE INVENTION

1. Field of the Invention

The present invention relates to a multi smoke cooker and more particularly pertains to providing a method for smoking and barbecuing food at the same time with a multi smoke cooker.

2. Description of the Prior Art

The use of barbecue grills is known in the prior art. More specifically, barbecue grills heretofore devised and utilized for the purpose of cooking food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,203,317 to James discloses an auxiliary burner.

U.S. Pat. No. 5,090,398 to Raymer et al. discloses an easily assembled barbecue grill with detachable accessory shelf and side burner.

U.S. Pat. No. 4,886,045 to Ducate, Jr. et al. discloses a side burner attachment for gas-fired grill.

U.S. Pat. No. 4,718,399 to Shepard discloses a barbeque wagon.

U.S. Pat. No. 4,688,541 to Stephen et al. discloses an attachment for barbecue grill.

While these devices fulfill their respective, particular objective and requirements, the aforementioned patents do not describe a multi smoke cooker for providing a method for smoking and barbecuing food at the same time.

In this respect, the multi smoke cooker according to the present invention substantially departs from the conventional concepts and designs of the prior art, and in doing so provides an apparatus primarily developed for the purpose of providing a method for smoking and barbecuing food at the same time.

Therefore, it can be appreciated that there exists a continuing need for new and improved multi smoke cooker which can be used for providing a method for smoking and barbecuing food at the same time. In this regard, the present invention substantially fulfills this need.

SUMMARY OF THE INVENTION

In the view of the foregoing disadvantages inherent in the known types of barbecue grills now present in the prior art, the present invention provides an improved multi smoke cooker. As such, the general purpose of the present invention, which will be described subsequently in greater detail, is to provide a new and improved multi smoke cooker and method which has all the advantages of the prior art and none of the disadvantages.

To attain this, the present invention essentially comprises a hollow container having an open top, a closed bottom a front wall, a rear wall, and two side walls. A pair of oblong apertures are formed through each of the two side walls downward of the open top. An upper opening is formed in the front wall. A lower opening is formed in the front wall downward of the upper opening. The device contains a pair of pot warmers each having a first end and a second end. Each first end is secured to the two side walls of the hollow container. Each first end covers the pair of oblong apertures thereof. The pair of pot warmers each have a separation slot therein separating each of the pot warmers from the two side walls. The device contains a pair of removable side walls each removably received within each separation slot of the pair of pot warmers. The side walls serve to contain heat within the container when not using the pot warmers. An inner lining is secured within the hollow container. The inner lining has two vertical posts. Each of the vertical posts has a first end, a second end, and an intermediate extent therebetween. Each first end has an inwardly extending piece integral therewith. Each second end has an inwardly extending piece integral therewith. Each intermediate extent has a plurality of inwardly extending pieces therewith. A grill is coupled with each first end and extends outwardly towards the open top of the hollow container. A grill grate is coupled with one of the plurality of inwardly extending pieces of the intermediate extent and aligned with the upper opening of the front wall of the container. The grill grate serves to hold coals. A coal catcher with outer handle is removably coupled with the inwardly extending piece of each second end and slidably extends outward of the lower opening of the hollow container. The device contains a top lid having a lower portion and an upper portion. The lower portion is hingedly secured to an edge of the open top of the hollow container. The upper portion has an adjustable vent therein. The device contains a front door hingedly secured to the front wall of the hollow container adjacent the upper opening thereof. The front door serves to allow access to the inner lining to add coals to the grill grate. The device contains a plurality of wheels secured to the closed bottom of the hollow container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multi smoke cooker which has all the advantages of the prior art barbecue grills and none of the disadvantages.

It is another object of the present invention to provide a new and improved multi smoke cooker which may be easily and efficiently manufactured and marketed.

It is a further object of the present invention to provide a new and improved multi smoke cooker which is of durable and reliable construction.

An even further object of the present invention is to provide a new and improved multi smoke cooker which is susceptible of a low cost of manufacture with regard to both materials and labor, and which accordingly is then susceptible of low prices of sale to the consuming public, thereby making such a multi smoke cooker economically available to the buying public.

Still yet another object of the present invention is to provide a new and improved multi smoke cooker which provides in the apparatuses and methods of the prior art some of the advantages thereof, while simultaneously overcoming some of the disadvantages normally associated therewith.

Even still another object of the present invention is to provide a new and improved multi smoke cooker for providing a method for smoking and barbecuing food at the same time.

Lastly, it is an object of the present invention to provide a new and improved multi smoke cooker with a hollow container having an open top, a closed bottom, a front wall, a rear wall, and two side walls. An upper opening is formed in the front wall. A lower opening is formed in the front wall downward of the upper opening. An inner lining is secured within the hollow container. The inner lining has two vertical posts. Each of the vertical posts has a plurality of inwardly extending pieces integral therewith. A grill is coupled with each vertical post and extends outwardly towards the open top of the hollow container. A grill grate is coupled with one of the plurality of inwardly extending pieces and aligned with the upper opening of the container. The grill grate serves to hold coals. A coal catcher with outer handle is removably coupled with two of the inwardly extending pieces and slidably extends outward of the lower opening of the hollow container. A top lid has a lower portion and an upper portion. The lower portion is hingedly secured to an edge of the open top of the hollow container. The upper portion has an adjustable vent therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevated cross-sectional view of the present invention.

FIG. 6 is a side elevated cross-sectional view of the present invention.

The same reference numerals refer to the same parts through the various figures.

DESCRIPTION OF THE PREFERRED EMBODIMENT

Figure 1:
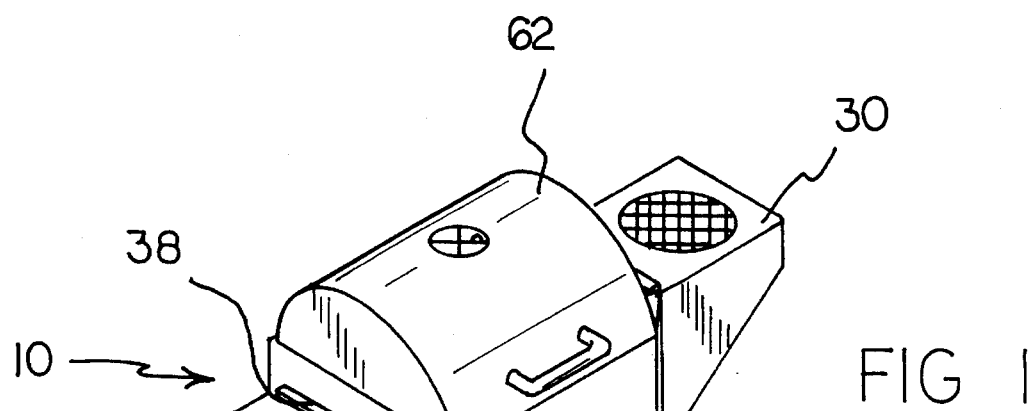
FIG. 1 is a perspective view of the preferred embodiment of the multi smoke cooker constructed in accordance with the principles of the present invention.
Figure 2:
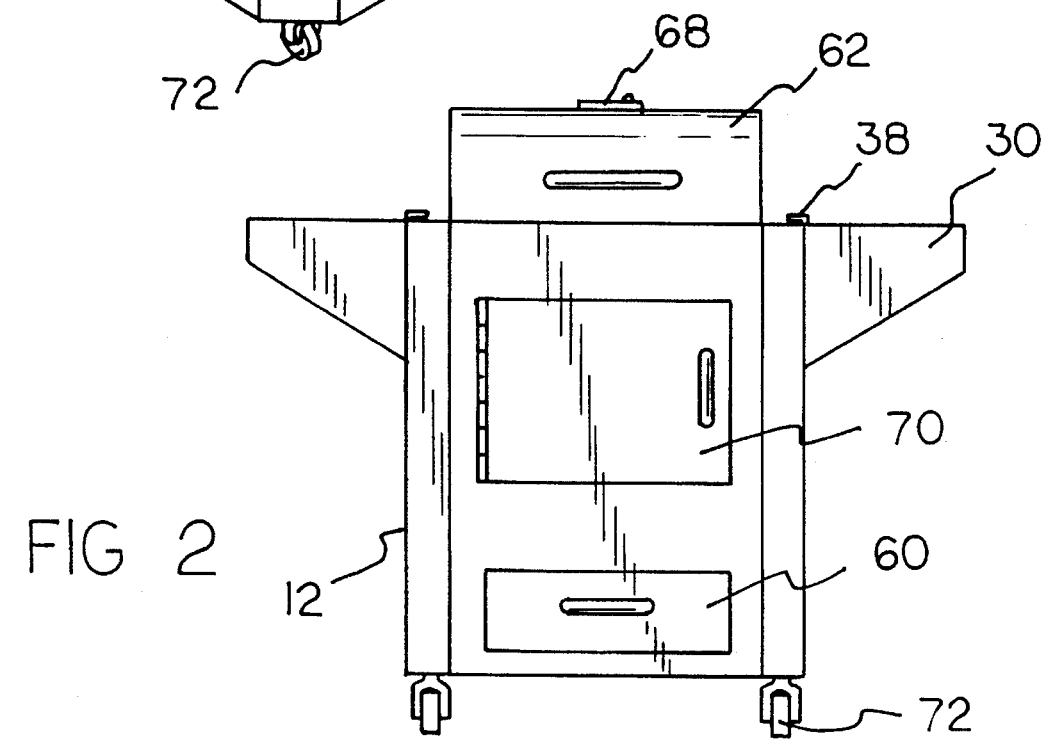
FIG. 2 is a front elevated view of the present invention.
Figure 3:
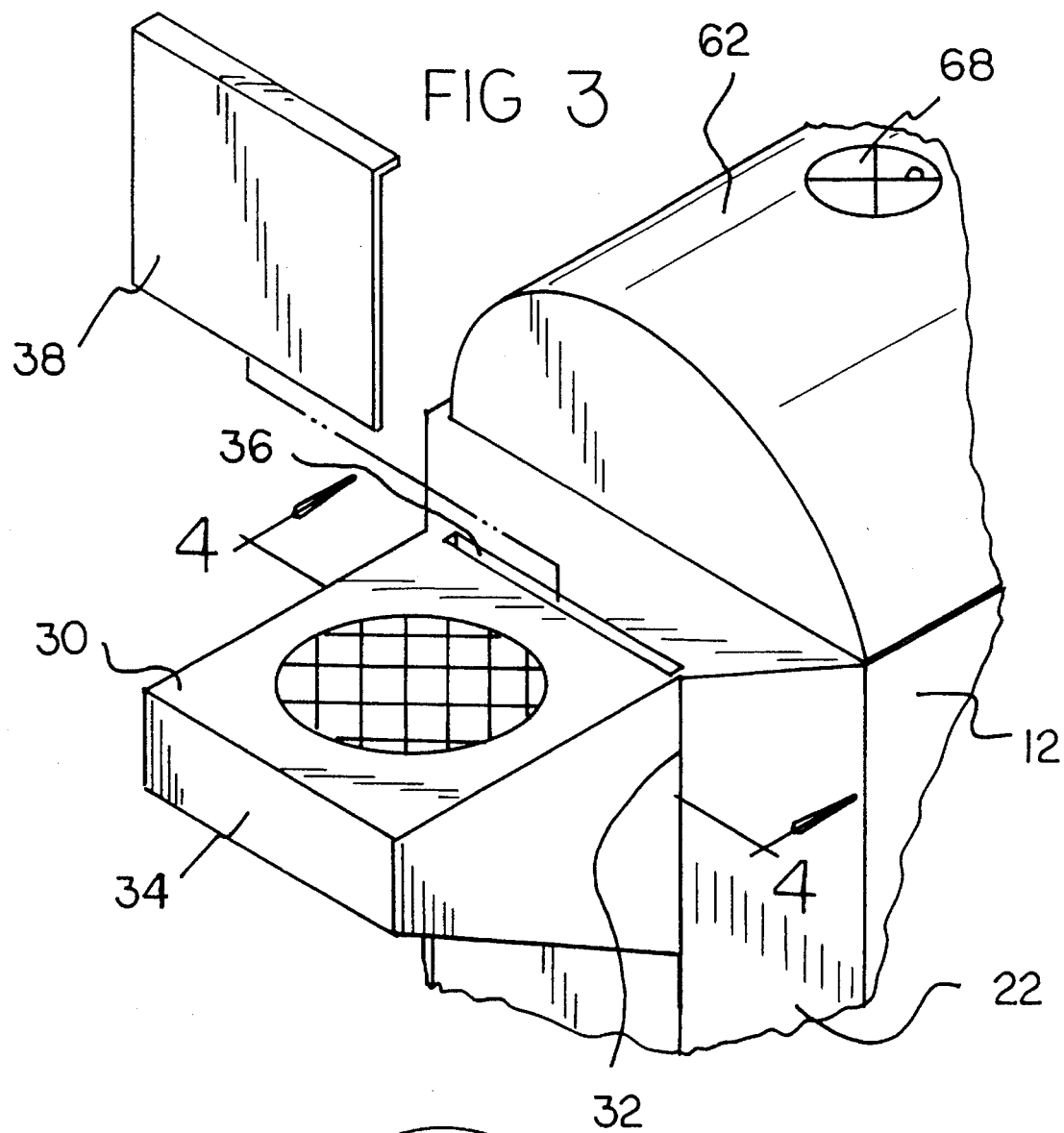
FIG. 3 is a partial perspective view of the warmer and shield of the present invention.
Figure 4:
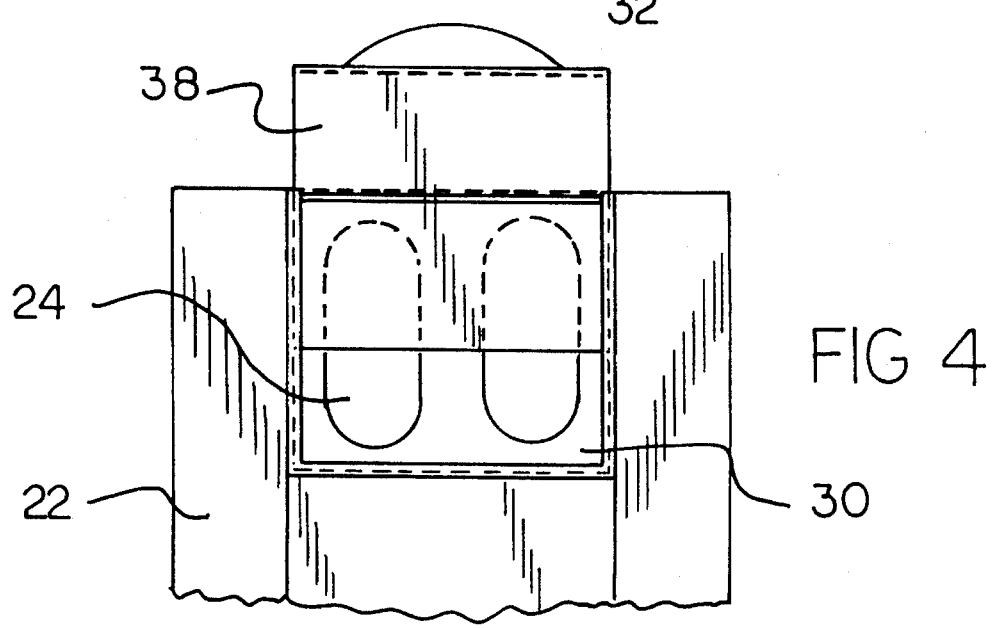
FIG. 4 is a cross-sectional view taken along line 4—4 of FIG. 3.
Figure 7:
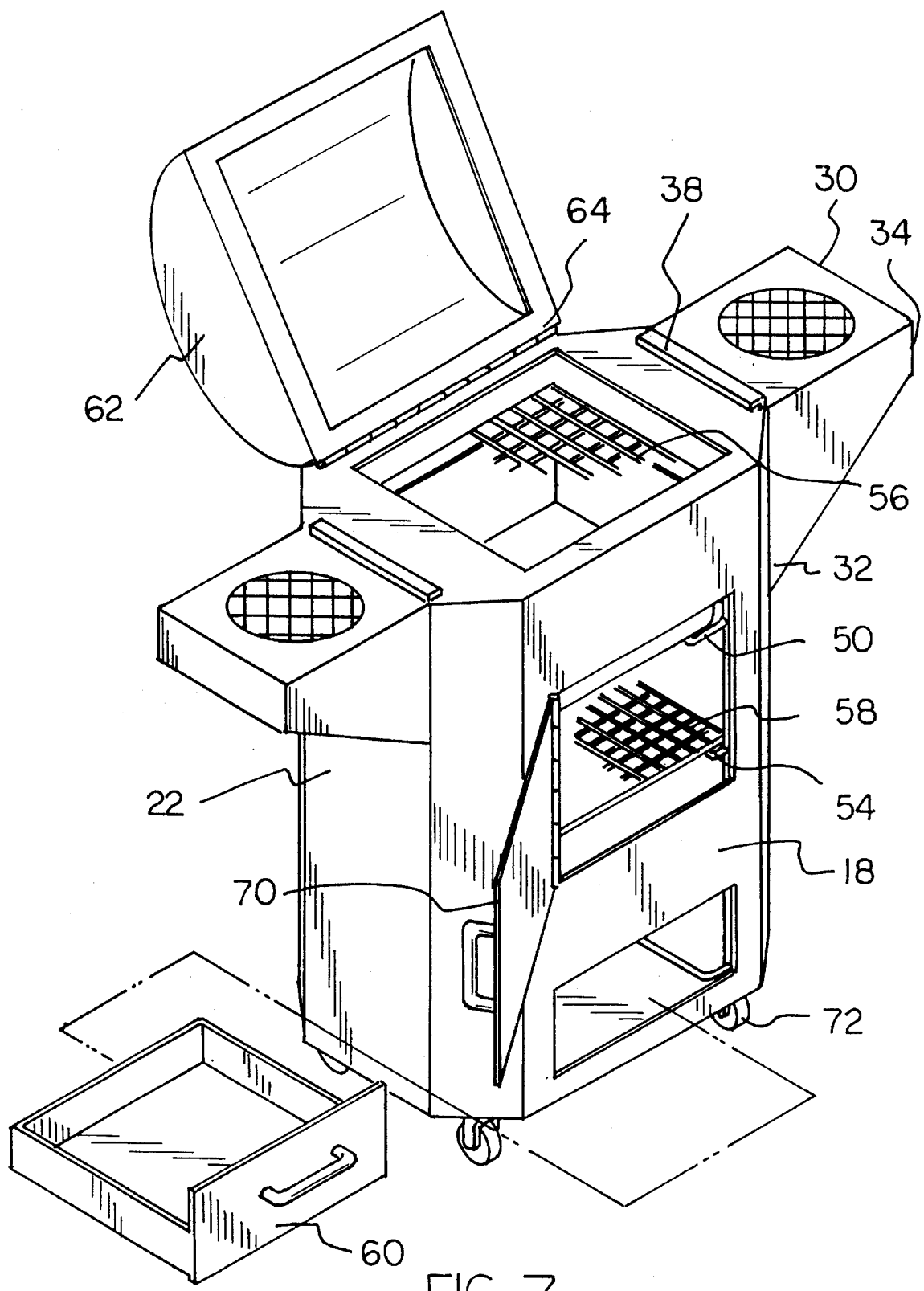
FIG. 7 is a perspective view of the present invention with all doors open.

With reference now to the drawings, and in particular, to FIG. 1 thereof, the preferred embodiment of the new and improved multi smoke cooker embodying the principles and concepts of the present invention and generally designated by the reference number 10 will be described.

Specifically, it will be noted in the various figures that the device relates to a new and improved multi smoke cooker for providing a method for smoking and barbecuing food at the same time. In its broadest context, the device consists of The device 10 contains a hollow container 12 having an open top 14, a closed bottom 16, a front wall 18, a rear wall 20, and two side walls 22. A pair of oblong apertures 24 are formed through each of the two side walls 22 downward of the open top 14. An upper opening 26 is formed in the front wall 18. A lower opening 28 is formed in the front wall 18 downward of the upper opening 26. The hollow container 12 is preferably constructed of steel to safely contain intense fire and heat.

The device 10 contains a pair of pot warmers 30 each having a first end 32 and a second end 34. Each first end 32 is secured to the two side walls 22 of the hollow container 12. Each first end 32 covers the pair of oblong apertures 24 thereof. The pair of pot warmers 30 each have a separation slot 36 therein separating each of the pot warmers 30 from the two side walls 22. The pot warmers 30 serve to contain cooked food and keep the food warm from heat generated within the container 12 and funneled through the oblong apertures 24 to the pot warmers 30.

The device 10 contains a pair of removable side walls 38 each removably received within each separation slot 36 of the pair of pot warmers 30. The side walls 38 serve to contain heat within the container 12 when not using the pot warmers 30. At times, the user will be cooking only one item and the need for the pot warmers 30 is eliminated. Covering up the oblong apertures 24 with the side walls 38 will contain the heat and channel it to a cooking area.

An inner lining 40 is secured within the hollow container 12. The inner lining 40 has two vertical posts 42. Each of the vertical posts 42 has a first end 44, a second end 46, and an intermediate extent 48 therebetween. Each first end 44 has an inwardly extending piece 50 integral therewith. Each second end 46 has an inwardly extending piece 52 integral therewith. Each intermediate extent 48 has a plurality of inwardly extending pieces 54 therewith. A grill 56 is coupled with each first end 44 and extends outwardly towards the open top 14 of the hollow container 12. A grill grate 58 is coupled with one of the plurality of inwardly extending pieces 54 of the intermediate extent 48 and aligned with the upper opening 26 of the front wall 18 of the container 12. The grill grate 58 serves to hold coals. When the coals are ignited, it sends heat up towards the grill 56 to cook meat or the like that are placed thereon for cooking. The heat also rises up to the oblong apertures 24 to heat the pot warmers 30 (if in place). A coal catcher 60 with outer handle is removably coupled with the inwardly extending piece 52 of each second end 46 and slidably extends outward of the lower opening 28 of the hollow container 12. The coal catcher 60 receives the burned embers produced by the coals and can easily be cleaned by removing from the container 12.

The device 10 contains a top lid 62 having a lower portion 64 and an upper portion 66. The lower portion 64 is hingedly secured to an edge of the open top 14 of the hollow container 12. The upper portion 66 has an adjustable vent 68 therein. Closing the top lid 62 while the meat is cooking produces a smoke cooking effect to the meat or the like that is in place on the grill 56. The adjustable vent 68 allows the user to determine the amount of heat that will escape.

The device 10 contains a front door 70 hingedly secured to the front wall 18 of the hollow container 12 adjacent the upper opening 26 thereof. The front door 70 serves to allow access to the inner lining 40 to add coals to the grill grate 58.

The device 10 contains a plurality of wheels 72 secured to the closed bottom 16 of the hollow container 12. The wheels 72 allow the user to easily transport the device 10.

Some folks like the taste of meat that has been both smoked and barbecued but requires two separate operations. The cook first puts the meat in a smoker, which provides a smoked taste (e.g., smoked turkey). Then the cook barbecues the smoked meat on the grill. This is a time-consuming operation because of the two separate tasks the cook must complete.

The present invention provides a way for the backyard cook to smoke and barbecue at the same time. The present invention resembles any sophisticated backyard cooking station that is available in specialty stores and catalogs. It has two removable warming trays on either side. If cooks are preparing more than one dish, they can use the warmers to keep the food hot until all the dishes have finished cooking. The grill has a stainless steel cover that lifts open on a set of internal hinges. On the inside is a grill to cook the meat. An inner lining keeps the heat contained, and also helps maintain the outside of the grill at a safer, lower temperature. This can be adjusted to the proper height to increase or decrease the cooking temperature as needed. Just below the inner lining is the coal rake where the coals are kept and is vented with a smoke vent toward the rear. In addition, the unit is provided with wheels for easy movement.

The cook places coals into the coal rake and ignites them. This sends heat and smoke up through the heat trap where it is diverted directly to the food cooking on the top. The smoke then escapes through the vent. The present invention should appeal to backyard cooks who are looking for a clean professional work station to smoke and barbecue their food.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved multi smoke cooker for providing a method for smoking and barbecuing food at the same time comprising, in combination:

a hollow container having an open top, a closed bottom, a front wall, a rear wall, and two side walls, an upper opening formed in the front wall, a lower opening formed in the front wall downward of the upper opening;

an inner lining secured within the hollow container, the inner lining having two vertical posts, each of the vertical posts having a plurality of inwardly extending pieces integral therewith, a grill coupled with each vertical post and extending outwardly towards the open top of the hollow container, a grill grate coupled with one of the plurality of inwardly extending pieces and aligned with the upper opening of the container, the grill grate serving to hold coals, a coal catcher with outer handle removably coupled with two of the inwardly extending pieces and slidably extending outward of the lower opening of the hollow container;

a top lid having a lower portion and an upper portion, the lower portion hingedly secured to an edge of the open top of the hollow container, the upper portion having an adjustable vent therein.

2. The cooker as described in claim 1 and further including wherein the hollow container having a pair of oblong apertures formed through each of the two side walls downward of the open top.

3. The cooker as described in claim 2 and further including wherein a pair of pot warmers each having a first end and a second end, each first end secured to the two side walls of the hollow container, each first end covering the pair of oblong apertures thereof, the pair of pot warmers each having a separation slot therein separating each of the pot warmers from the two side walls.

4. The cooker as described in claim 3 and further including wherein a pair of removable side walls each removably received within each separation slot of the pair of pot warmers, the side walls serving to contain heat within the container when not using the pot warmers.

5. The cooker as described in claim 4 and further including wherein a front door hingedly secured to the front wall of the hollow container adjacent the upper opening thereof, the front door serving to allow access to the inner lining to add coals to the grill grate thereof.

6. The cooker as described in claim 5 and further including wherein a plurality of wheels secured to the closed bottom of the hollow container.

7. A new and improved multi smoke cooker for providing a method for smoking and barbecuing food at the same time comprising, in combination:

a hollow container having an open top, a closed bottom, a front wall, a rear wall, and two side walls, a pair of oblong apertures formed through each of the two side walls downward of the open top, an upper opening formed in the front wall, a lower opening formed in the front wall downward of the upper opening;

a pair of pot warmers each having a first end and a second end, each first end secured to the two side walls of the hollow container, each first end covering the pair of oblong apertures thereof, the pair of pot warmers each having a separation slot therein separating each of the pot warmers from the two side walls;

a pair of removable side walls each removably received within each separation slot of the pair of pot warmers, the side walls serving to contain heat within the container when not using the pot warmers;

an inner lining secured within the hollow container, the inner lining having two vertical posts, each of the vertical posts having a first end, a second end, and an intermediate extent therebetween, each first end having an inwardly extending piece integral therewith, each second end having an inwardly extending piece integral therewith, each intermediate extent having a plurality of inwardly extending pieces therewith, a grill coupled with each first end and extending outwardly towards the open top of the hollow container, a grill grate coupled with one of the plurality of inwardly extending pieces of the intermediate extent and aligned with the upper opening of the front wall of the container, the grill grate serving to hold coals, a coal catcher with outer handle removably coupled with the inwardly extending piece of each second end and slidably extending outward of the lower opening of the hollow container;

a top lid having a lower portion and an upper portion, the lower portion hingedly secured to an edge of the open top of the hollow container, the upper portion having an adjustable vent therein;

a front door hingedly secured to the front wall of the hollow container adjacent the upper opening thereof, the front door serving to allow access to the inner lining to add coals to the grill grate;

a plurality of wheels secured to the closed bottom of the hollow container.

* * * * *